US008187716B2

(12) United States Patent
Sutter et al.

(10) Patent No.: US 8,187,716 B2
(45) Date of Patent: May 29, 2012

(54) AQUEOUS ADHESION PROMOTER COMPOSITION COMPRISING AN AMINOSILANE AND A MERCAPTOSILANE

(75) Inventors: Jolanda Sutter, Oberwil (CH); Wolf-Rudiger Huck, Zurich (CH)

(73) Assignee: Sika Technology AG, Baar (CH)

( * ) Notice: Subject to any disclaimer, the term of this patent is extended or adjusted under 35 U.S.C. 154(b) by 390 days.

(21) Appl. No.: 12/309,920

(22) PCT Filed: Aug. 31, 2007

(86) PCT No.: PCT/EP2007/059130
§ 371 (c)(1),
(2), (4) Date: Feb. 20, 2009

(87) PCT Pub. No.: WO2008/025846
PCT Pub. Date: Mar. 6, 2008

(65) Prior Publication Data
US 2009/0226738 A1    Sep. 10, 2009

(30) Foreign Application Priority Data

Aug. 31, 2006  (EP) ..................... 06119931

(51) Int. Cl.
*B32B 27/06*  (2006.01)
*B32B 9/04*  (2006.01)
(52) U.S. Cl. ............... 428/447; 156/307.1; 156/307.7
(58) Field of Classification Search .......... 156/307.1, 156/307.7; 428/447
See application file for complete search history.

(56) References Cited

U.S. PATENT DOCUMENTS

2007/0054077 A1 * 3/2007 Barrese et al. .............. 428/35.7
2008/0245271 A1   10/2008 Trabesinger et al.

FOREIGN PATENT DOCUMENTS

| CA | 2560989 A1 | 10/2005 |
|----|------------|---------|
| EP | 0 577 014 B1 | 1/1997 |
| EP | 1 002 889 A2 | 5/2000 |
| EP | 1 582 571 A1 | 10/2005 |
| JP | A-07-331454 | 12/1995 |
| JP | A-2000-144020 | 5/2000 |
| JP | A-2003-034881 | 2/2003 |
| JP | A-2006-052348 | 2/2006 |
| WO | WO 2005/093002 A1 | 10/2005 |

OTHER PUBLICATIONS

Japanese Patent Office, Notice of Reasons for Rejection mailed Nov. 22, 2011 in Japanese Patent Application No. 2009-526119 w/English-language Translation.

* cited by examiner

*Primary Examiner* — Terressa Boykin
(74) *Attorney, Agent, or Firm* — Oliff & Berridge, PLC

(57) ABSTRACT

Aqueous adhesion promoter compositions include at least one aminosilane and/or aminosiloxane and also at least one mercaptosilane. The adhesion promoter compositions are suitable more particularly as primers or adhesion-promoter undercoats for adhesives and sealants. They are especially suitable for the adhesive bonding of vehicle glazing. Exceptionally high adhesion has been found more particularly with glazing featuring applied silver prints.

30 Claims, 2 Drawing Sheets

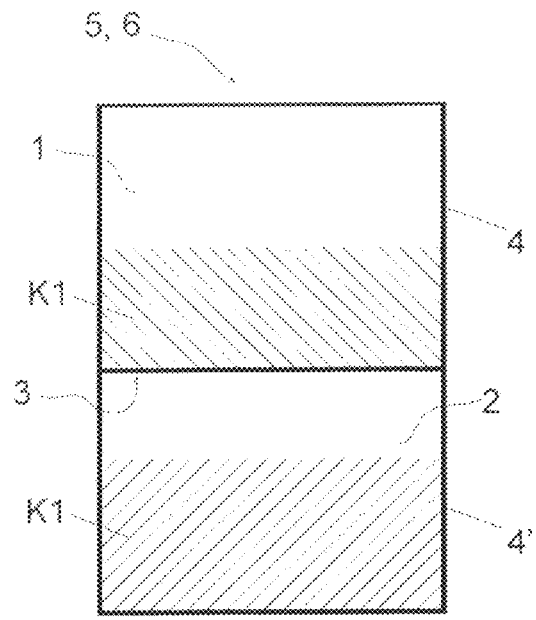
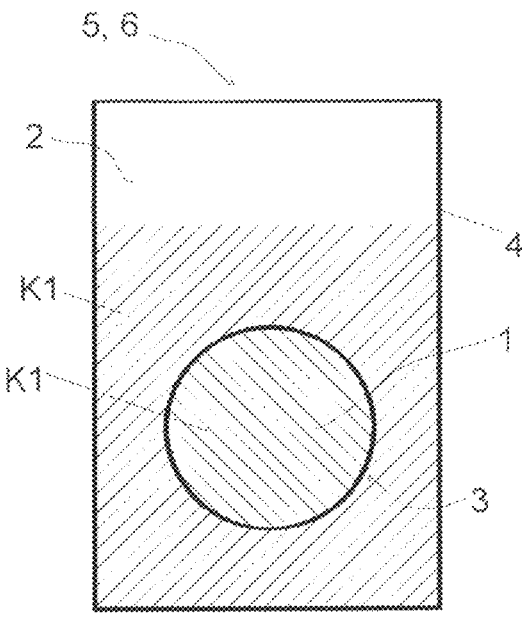
Fig. 1a)  Fig. 1b)
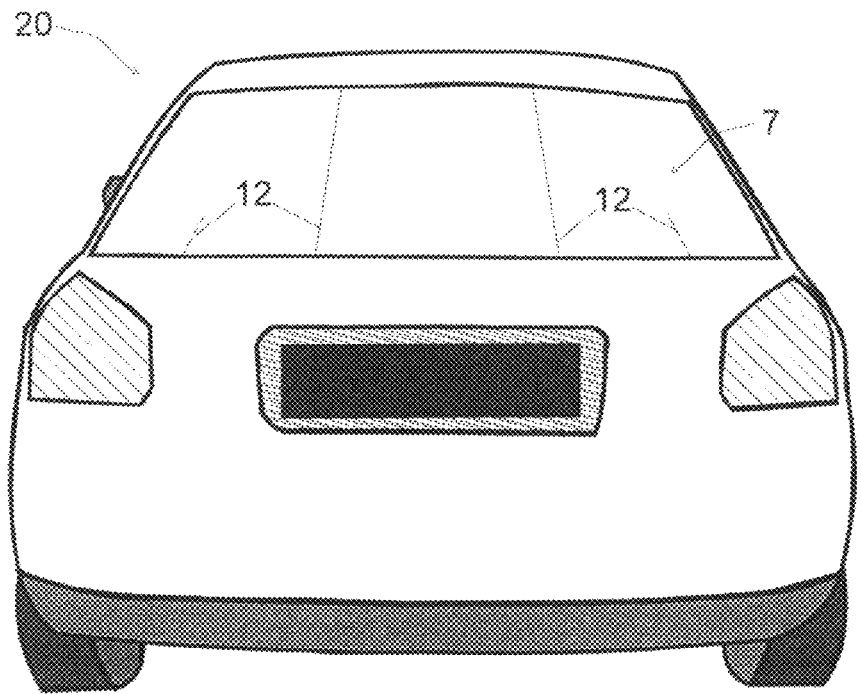
Fig. 2)

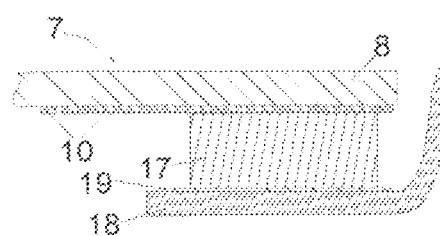
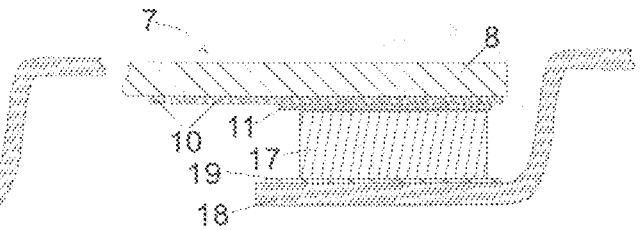
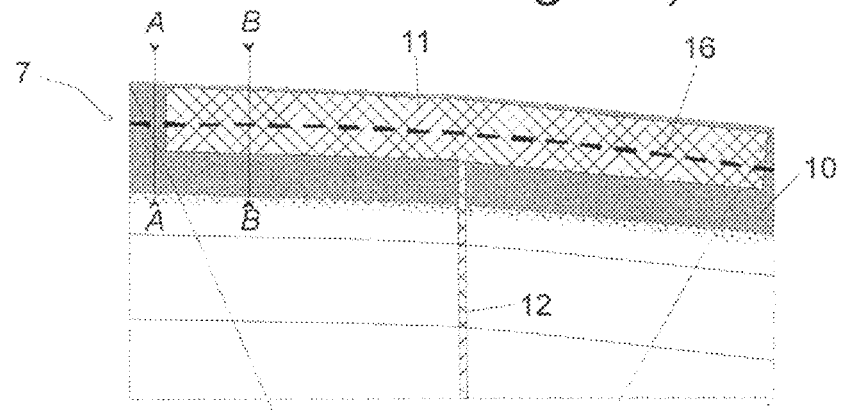
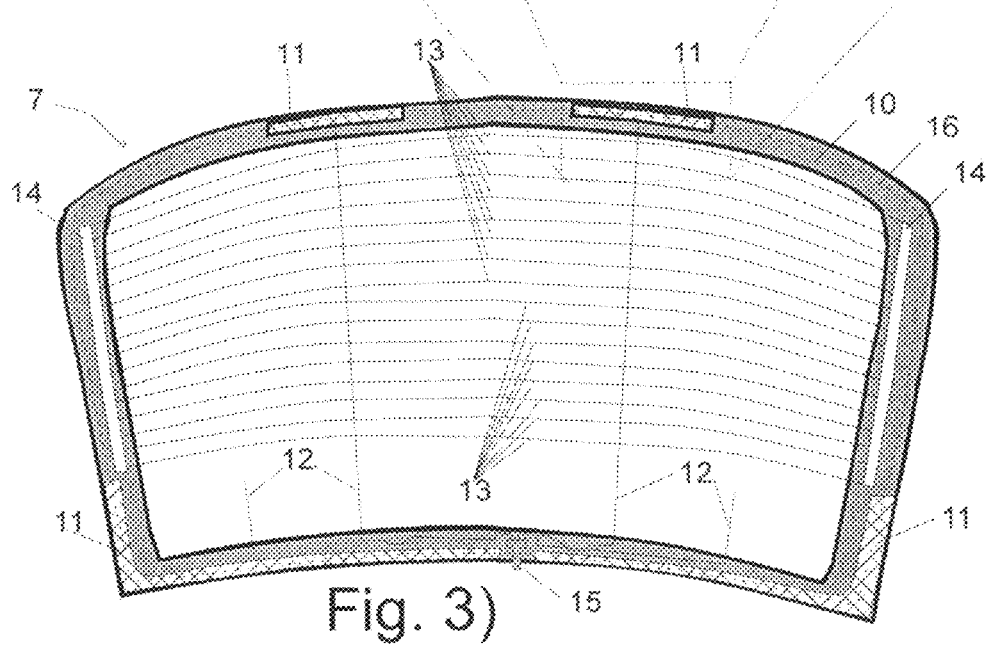

AQUEOUS ADHESION PROMOTER COMPOSITION COMPRISING AN AMINOSILANE AND A MERCAPTOSILANE

FIELD OF THE INVENTION

The invention pertains to the field of aqueous adhesion promoter compositions.

DESCRIPTION OF THE PRIOR ART

Adhesion promoter compositions have been used for a long time to improve adhesion. Such compositions typically are based on organosilanes. Adhesion promoter compositions of this kind are used more particularly as primers, i.e., as an adhesion-enhancing undercoat. Compositions of this kind or primers typically contain inert, highly volatile solvents, in order to ensure rapid flashoff. Solvents, however, especially those referred to as VOCs (Volatile Organic Compounds) are increasingly coming under fire, and increasingly the market is calling for low-solvent, and especially solvent-free, or VOC-free, adhesion promoter compositions.

Aqueous adhesion promoter compositions are known. However, they are not without their disadvantages. EP-A-0 577 014, for instance, describes an aqueous primer containing an aminosilane or a mercaptosilane. WO 2005/093002 A1 discloses two-component adhesion promoter compositions, which in one preferred embodiment constitute an aqueous adhesion promoter composition comprising a mixture of an alkyl-trialkoxysilane with an aminoalkyl-trialkoxysilane and/or mercaptoalkyl-trialkoxysilane.

In the context of the present invention, however, it has surprisingly emerged that, in mixtures of this kind, the adhesion to glass, particularly after water storage, is greatly impaired when the fraction of alkylsilane exceeds a certain level.

One particularly important field of use of the adhesion promoter composition is in vehicle construction, particularly in the installation of glazing, i.e., the bonding of glazing sheets to vehicle bodies. The glazing sheets of the most recent generation feature integrated aerials and consequently, in the edge region of the sheet—where the adhesive is applied—feature surfaces of silver, silver-based compositions or alloys. On these surfaces, however, a major part of the polyurethane adhesives that are used have adhesion problems, even utilizing known adhesion promoter compositions.

SUMMARY OF THE INVENTION

It is an object of the present invention, therefore, to provide aqueous compositions which overcome the disadvantages of the prior art. Surprisingly it has now been found that aqueous adhesion promoter compositions of claim 1 achieve this object.

It has emerged, surprisingly, that, in the context of their use for moisture-curing one-component polyurethane adhesives, the adhesion promoter compositions of the invention result in effective adhesion to a multiplicity of substrates. In particular is has been possible to show that aqueous adhesion promoter compositions of this kind lead to effective adhesion on glass, ceramic, and silver, and silver-based compositions.

More particularly it has been found that the use of mercaptosilanes leads to a great improvement in the adhesion to silver, or to silver-based compositions or alloys.

This is especially important in vehicle construction for the installation using polyurethane adhesives of glazing sheets with an integrated aerial that contain regions of such surfaces.

It has further been found that very storage-stable adhesion promoter compositions of the invention can be formulated.

BRIEF DESCRIPTION OF THE DRAWINGS

FIGS. 1a) and 1b) represent, diagrammatically, cross sections through two embodiments.

FIG. 2 shows, diagrammatically, the tail view of an automobile with a new-generation glazing sheet with integrated aerial.

FIG. 3 and FIGS. 3a) to 3c) show, diagrammatically, a glazing sheet with integrated aerial.

DESCRIPTION OF THE PREFERRED EMBODIMENTS

The present invention provides aqueous adhesion promoter compositions which comprise at least one aminosilane of the formula (I) or at least one aminosiloxane AS obtained from a condensation reaction of an aminosilane of the formula (I) with at least one further silane, and also at least one mercaptosilane of the formula (II) and either which has an alkylsilanes content of 0% to 45% by weight, more particularly 0% to 25% by weight, based on the weight of the aminosilane or aminosiloxane AS, or in which the ratio of the number of moles of alkylsilanes to the number of moles of aminosilane or aminosiloxane AS amounts to a value of 0-0.60, more particularly 0-0.33.

where
$R^1$ is an n-valent organic radical having at least one primary and/or secondary amino group,
$R^{1'}$ is an m-valent organic radical having at least one mercapto group,
$R^2$ and $R^{2'}$ each independently are H or an alkyl group having 1 to 4 C atoms or are an acyl group;
$R^3$ and $R^{3'}$ each independently are H or are an alkyl group having 1 to 10 C atoms;
a and b each independently stand for a value of 0, 1 or 2;
and n and m each independently stand for the values 1, 2, 3, and 4.

The term "each independently" that is used herein denotes here not only "independently of the other ingredients" but also "independently within the same molecule". Thus, for example, hydroxy-dimethoxy-aminosilanes ($R^2$=methyl, $R^2$=methyl, $R^2$=H) are also possible.

Throughout the present document the terms "organosilanes" refer to silanes which contain at least one organic radical which is attached via an Si—C bond to the silicon atom. "Alkylsilanes" are organosilanes whose organic radical is a hydrocarbon group. These alkylsilanes contain no further organic radicals, attached via C—Si bonds, with functional groups having heteroatoms, such as amino groups or mercapto groups. "Aminosilanes" and "mercaptosilanes" are, respectively, organosilanes whose organic radical has an amino group or a mercapto group. In accordance with this definition, accordingly, "tetraalkoxysilanes" are not organosilanes. The term "aminosiloxane" refers to compounds which contain at least one Si—O—Si bond and have at least two organic radicals which are attached via an Si—C bond to the silicon atoms. At least one of these organic radicals in this case has an amino group.

The composition contains at least one aminosilane of the formula (I) or an aminosiloxane AS obtained from a condensation reaction of an aminosilane of the formula (I) with at least one further silane. Particular preference is given to alkoxysilanes, i.e. aminosilanes of the formula (I) in which $R^2$ is an alkyl group having 1 to 4 C atoms. Particularly preferred are methoxysilanes ($R^2$=methyl) and ethoxysilanes ($R^2$=ethyl). Aminosilanes with trialkoxy groups (a=0), more particularly trimethoxysilane groups, have proven particularly advantageous.

In the presence of water it is possible for alkoxysilanes to undergo hydrolysis, and silanols are formed, i.e., silanes with Si—OH moieties ($R^2$=H). In this case it is possible in particular for partially hydrolyzed products to be formed as well. As an end stage of such hydrolysis reactions there are silanetriols.

Particularly suitable aminosilanes are aminosilanes which are selected from the group consisting of 3-aminopropyltrimethoxysilane, 3-aminopropyl-dimethoxymethylsilane, 3-amino-2-methylpropyltrimethoxysilane, 4-aminobutyl-trimethoxysilane, 4-aminobutyldimethoxymethylsilane, 4-amino-3-methylbutyl-trimethoxysilane, 4-amino-3,3-dimethylbutyltrimethoxysilane, 4-amino-3,3-di-methylbutyldimethoxymethylsilane, 2-aminoethyltrimethoxysilane, 2-amino-ethyldimethoxymethylsilane, aminomethyltrimethoxysilane, aminomethyldimethoxymethylsilane, aminomethylmethoxydimethylsilane, N-methyl-3-aminopropyltrimethoxysilane, N-ethyl-3-aminopropyltrimethoxysilane, N-butyl-3-aminopropyltrimethoxysilane, N-cyclohexyl-3-aminopropyltrimethoxysilane, N-phenyl-3-aminopropyltrimethoxysilane, N-methyl-3-amino-2-methylpropyltrimethoxysilane, N-ethyl-3-amino-2-methylpropyltrimethoxysilane, N-ethyl-3-aminopropyldimethoxymethylsilane, N-phenyl-4-aminobutyltrimethoxysilane, N-phenylaminomethyldimethoxymethylsilane, N-cyclohexylaminomethyldimethoxymethylsilane, N-methylaminomethyldimethoxymethylsilane, N-ethyl-aminomethyldimethoxymethylsilane, N-propylaminomethyldimethoxymethyl-silane, N-butylaminomethyldimethoxymethylsilane; N-(2-aminoethyl)-3-aminopropyltrimethoxysilane, 3-[2-(2-aminoethylamino)ethylamino]propyltrimethoxysilane, bis(trimethoxysilylpropyl)amine, and also their analogs with ethoxy or isopropoxy groups in place of the methoxy groups on the silicon.

In one embodiment the aminosilane of the formula (I) is an aminosilane of the formula (V)

$$H_2N—R^5—Si(OR^2)_{(3-a)}(R^3)_a \quad (V)$$

where $R^5$ is a linear or branched alkylene group having 1 to 6 C atoms, more particularly propylene. Considered particularly preferred in this context is 3-aminopropyltrimethoxysilane.

In one preferred embodiment the aminosilane of the formula (I) contains secondary amino groups. In particular these aminosilanes are of the formula (VI) or (VII) or (VIII).

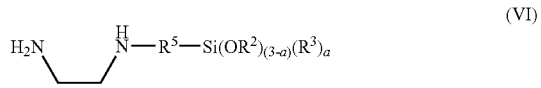
(VI)

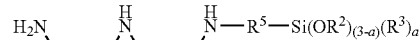
(VII)

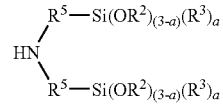
(VIII)

where $R^5$ is a linear or branched alkylene group having 1 to 6 C atoms, more particularly propylene. Those which have shown themselves to be particularly preferred are N-(2-aminoethyl)-3-aminopropyltrimethoxysilane, 3-[2-(2-aminoethylamino)ethylamino]propyltrimethoxysilane and bis(trimethoxysilylpropyl)amine.

It has emerged as being particularly advantageous if there are two or more aminosilanes of the formula (I) in the composition. Preferably at least one of the aminosilanes has the formula (VI).

In one embodiment the composition contains aminosiloxanes AS. These aminosiloxanes are obtained from a condensation reaction of an aminosilane of the formula (I) with at least one further silane. To the person skilled in the art it is clear that the silanes involved in the condensation ought preferably to be hydrolyzed or at least partly hydrolyzed. Silanes involved are preferably alkylsilanes in particular. The product in this case is an aminosiloxane which as well as amino groups additionally contains alkyl groups. The degree of condensation may vary. There may be dimers, trimers or oligomers. The aminosiloxanes AS may also contain alkoxysilane groups. The aminosiloxanes AS can preferably be dispersed or are miscible or soluble in water. Aminosiloxanes AS of this kind are available commercially in the form, for example, of Dynasylan® HDYROSIL 2627, Dynasylan® HDYROSIL 2776 or Dynasylan® HDYROSIL 2929 from Degussa AG, Germany.

The composition contains at least one mercaptosilane of the formula (II). Particular preference is given to alkoxysilanes, i.e., mercaptosilanes of the formula (II) in which $R^{2'}$ is an alkyl group having 1 to 4 C atoms. Particular preference is given to methoxysilanes ($R^{2'}$=methyl) and ethoxysilanes ($R^{2'}$=ethyl). Mercaptosilanes with trialkoxy groups (b=0), especially trimethoxysilane groups, have proven particularly advantageous.

In the presence of water it is possible for alkoxysilanes to undergo hydrolysis, forming silanols, i.e., silanes with Si—OH moieties ($R^{2'}$=H). In this case it is possible in particular for the products to include partially hydrolyzed products. The end stage of such hydrolysis reactions are silanetriols.

The mercaptosilane of the formula (II) preferably has the formula (IX):

$$HS—R^{5'}—Si(OR^{2'})_{(3-b)}(R^{3'})_b \quad (IX)$$

where $R^{5'}$ is a linear or branched alkylene group having 1 to 6 C atoms, more particularly propylene.

Particularly preferred mercaptosilanes are 3-mercaptopropyltrimethoxysilane and 3-mercaptopropyltriethoxysilane.

Additionally the aqueous adhesion promoter composition in one alternative has an alkylsilanes content of 0% to 45% by weight, more particularly 0% to 25% by weight, based on the weight of the aminosilane or the aminosiloxane. Alternatively the ratio of the number of moles of alkylsilanes to the number of moles of aminosilane or aminosiloxane AS in the aqueous adhesion promoter composition amounts to a value of 0-0.60, more particularly 0-0.33. If the alkylsilanes content is greater, the adhesion, particularly to glass, becomes increasingly worse. Preferably, however, the aqueous adhesion promoter composition is free of alkylsilanes. Alkylsilane-free aqueous adhesion promoter compositions of this kind exhibit effective adhesion both to glass and to silver or to silver-based compositions.

Alkylsilanes are, in particular, alkylsilanes of the formula (III):

where
R$^{1'''}$ is a saturated or unsaturated alkyl group or aryl or aralkyl group;
R$^{2'''}$ independently at each occurrence is H or an alkyl group having 1 to 4 C atoms or is an acyl group;
R$^{3'''}$ independently at each occurrence is H or is an alkyl group having 1 to 10 C atoms;
and c is a value of 0, 1 or 2.

It has been found that alkylsilanes adversely affect the adhesion to glass.

Additionally it is preferred for the aqueous adhesion promoter composition to be substantially free, preferably free, of organosilanes OS whose organic radical which is attached via an Si—C bond to the silicon atom contains at least one functional group that is able to react with the amino group of the aminosilane of the formula (I) or of the aminosiloxane AS or with the mercapto group of the mercaptosilane of the formula (II).

With particular preference the aqueous adhesion promoter composition is substantially free, preferably free, of organosilanes whose organic radical which is attached via an Si—C bond to the silicon atom contains hydroxyl groups.

By "substantially free" here is meant an amount of less than 3% by weight, more particularly of less than 1% by weight, based on the weight of the aqueous composition.

It has, however, proven particularly advantageous for the aqueous adhesion promoter composition further to comprise at least one tetraalkoxysilane of the formula (IV)

where R$^4$ each independently is H or an alkyl group having 1 to 4 C atoms or is an acyl group, especially acetyl group. Examples of such tetraalkoxysilanes are tetramethoxysilane, tetraethoxysilane, tetraisopropoxysilane, tetrapropoxysilane, tetrabutoxysilane, and tetraacetoxysilane. Tetraethoxysilane has proven particularly preferred.

The aqueous composition may be comprised of further constituents. Such additional constituents are surfactants, acids, catalysts, cosolvents, biocides, antisettling agents, stabilizers, inhibitors, pigments, dyes, corrosion inhibitors, odorants, UV indicators, thixotropic agents, fillers, defoamers, further organosilanes, titanates, and the like.

Cosolvents are understood to be water-miscible solvents, such as alcohols or ethers or ketones, for example. It is preferred, however, for such solvents to be used only in a small amount, i.e., typically less than 10% by weight relative to the water. With particular preference the composition—apart from traces of alcohols which come about from the hydrolysis of the alkoxysilanes used in the aqueous composition—is free from such cosolvents. If a relatively large amount of solvent is used, the VOC problems are intensified, whereas avoiding VOCs is actually a principal reason for using aqueous compositions.

Surfactants are preferably additional constituents of the aqueous composition.

Surfactants which can be used include natural or synthetic substances which, in solutions, lower the surface tension of the water or of other liquids. Surfactants which can be used, also called wetting agents, include anionic, cationic, nonionic, and ampholytic surfactants or mixtures thereof.

Examples of anionic surfactants are surfactants containing carboxylate, sulfate, phosphate or sulfonate groups, such as, for example, amino acid derivatives, fatty alcohol ether sulfates, fatty alcohol sulfates, soaps, alkylphenol ethoxylates, fatty alcohol ethoxylates, and also alkanesulfonates, olefinsulfonates or alkyl phosphates.

The nonionic surfactants include, for example, ethoxylates, such as, for example, ethoxylated adducts of alcohols, such as polyoxyalkylene polyols, amines, fatty acids, fatty acid amides, alkylphenols, ethanol amides, fatty amines, polysiloxanes or fatty acid esters, and also alkyl or alkylphenyl polyglycol ethers, such as fatty alcohol polyglycol ethers, or fatty acid amides, alkylglycosides, sugar esters, sorbitan esters, polysorbates or trialkylamine oxides, but also esters and amides of poly(meth)acrylic acids, with polyalkylene glycols or aminopolyalkylene glycols, which may be capped at not more than one end with alkyl groups.

Examples of cationic surfactants are quaternary ammonium or phosphonium compounds, such as tetraalkylammonium salts, N-,N-dialkyl-imidazoline compounds, dimethyl-distearylammonium compounds, or N-alkyl-pyridine compounds, especially ammonium chlorides.

The ampholytic or amphoteric surfactants include amphoteric electrolytes, known as ampholytes, such as aminocarboxylic acids, for example, and betaines.

Surfactants of this kind are widely available commercially.

Particular suitability is possessed by alkoxylated alcohols. Those which have shown themselves to be suitable include, in particular, alkoxylated nonionic fluorosurfactants, especially Zonyl® FSO-100, which is available commercially from ABCR, Germany, and alkoxylated alcohols or alkoxylated alkylphenols, especially Antarox FM 33, which in commercial terms is available commercially from Rhodia.

Additionally very preferred are alkoxylated fatty alcohols, particularly the one commercialized by Cognis as Hydropalat® 120.

Acids are likewise preferred additional constituents of the aqueous composition. The acid may be organic or inorganic. Organic acids are, on the one hand, carboxylic acids, especially a carboxylic acid selected from the group encompassing formic, acetic, propionic, trifluoroacetic, oxalic, malonic, succinic, maleic, fumaric, and citric acid, and also amino acids, especially aspartic acid and glutamic acid. Preferred acids are those which have a pK$_a$ of between 4.0 and 5. By "pK$_a$" the chemist means, as is known, the negative base-ten logarithm of the acid dissociation constant K$_a$: pK$_a$=−log$_{10}$ K$_a$.

A preferred carboxylic acid is acetic acid.

Organic acids are on the other hand, in particular, those which contain a sulfur atom or a phosphorus atom. Organic acids of this kind are, in particular, organic sulfonic acids. An organic sulfonic acid is one of the compounds which contains an organic radical containing carbon atoms and also at least one functional group —SO$_3$H.

The aromatic sulfonic acid may be monocyclic or polycyclic and there may be one or more sulfonic acid groups present. Examples of such include 1- or 2-naphthalenesulfonic acid, 1,5-naphthalenedisulfonic acid, benzenesulfonic acid or alkylbenzenesulfonic acids.

Preferred aromatic acids are those which have the formula (X)

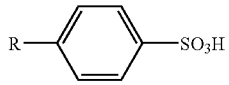

R in this formula is an alkyl radical having 1 to 18 atoms. Preferably R is a methyl or dodecyl group, more particularly a dodecyl group.

The acid may further be an inorganic acid. Inorganic acids which have shown themselves to be suitable are more particularly those which contain a sulfur atom or a phosphorus atom.

Acids containing phosphorus atoms are, in particular, phosphoric acid, phosphorous acid, phosphonic acid, and phosphonous acid.

Acids containing sulfur atoms are, in particular, sulfuric acids, especially sulfuric acid, sulfurous acids, persulfuric acid, disulfuric acid (i.e., pyrosulfuric acid), disulfurous acid, dithionic acid, dithionous acid, thiosulfuric acid or thiosulfurous acid.

In one preferred embodiment the aqueous adhesion promoter composition is composed of water, at least one aminosilane of the formula (I), at least one mercaptosilane of the formula (II), if desired, at least one tetraalkoxysilane, and also the possible hydrolysis and/or condensation products thereof.

In another preferred embodiment the aqueous adhesion promoter composition is composed of water, at least one aminosilane of the formula (I), at least one mercaptosilane of the formula (II), at least one surfactant, at least one acid, if desired, at least one tetraalkoxysilane, and also of the possible hydrolysis and/or condensation products thereof.

In another preferred embodiment the aqueous adhesion promoter composition is composed of water, at least one aminosilane of the formula (I), at least one mercaptosilane of the formula (II), and, if desired, a surfactant and an acid, more particularly an organic acid, and also of the possible hydrolysis and/or condensation products thereof.

In the aqueous adhesion promoter composition the weight fraction of the total of aminosilane of the formula (I), aminosiloxane AS, mercaptosilane of the formula (II), and water and also, if present, tetraalkoxysilane of the formula (IV) is advantageously more than 80% by weight, in particular more than 90% by weight, based on the weight of the aqueous adhesion promoter composition.

The weight fraction of the total of aminosilane of the formula (I), aminosiloxane AS, mercaptosilane of the formula (II) total and—if present—tetraalkoxysilane of the formula (IV) is advantageously more than 0.1% by weight, more particularly between 0.1% and 10% by weight, preferably between 0.1% and 5% by weight, most preferably between 0.5% to 2% by weight, based on the weight of the aqueous adhesion promoter composition.

The weight ratio of the sum of aminosilane of the formula (I) and aminosiloxane AS to mercaptosilane of the formula (II) is advantageously 1:10 to 10:1, more particularly 1:2 to 2:1, preferably 1:1.5 to 1.5:1.

The aqueous adhesion promoter composition is preferably in the form of a two-component composition composed of a first component K1 and a second component K2. In this case it is advantageous if the first component K1 comprises at least the aminosilane of the formula (I) or at least the aminosiloxane AS and the mercaptosilane of the formula (II) and—if present—the tetraalkoxysilane of the formula (IV), while the second component K2 comprises at least water.

If the composition comprises a surfactant and/or an acid, said surfactant and/or acid may be part of the first component K1 and/or of the second component K2. It is advantageous, however, for the surfactant to be part of the second component K2. With further advantage the acid is part of the second component K2.

A further aspect of the present invention is a packaging form. The packaging form is composed of a pack having two chambers, which has chambers separated from one another by at least one partition, and an aqueous two-component adhesion promoter composition as described above. Its first component K1 is present in the first chamber and its second component K2 in the second chamber.

FIGS. 1a) and 1b) represent, diagrammatically, cross sections through two embodiments. The packaging form 6 is composed of a pack 5 which has chambers 1, 2 separated from one another by at least one partition 3; and of the two-component composition whose first component K1 is present in the first chamber 1 and whose second component K2 is present in the second chamber 2.

FIG. 1a) shows an embodiment in which the partition 3 extends between the two outer walls 4, 4' of the first and second chambers 1, 2.

FIG. 1b) shows an embodiment in which the first chamber 1 is sited within the second chamber 2 and therefore the first chamber 1 is surrounded completely by the second chamber, and the first chamber 1 is bounded completely by the partition 3.

Packaging forms of this kind are very well suited to the storage of the two-component adhesion promoter compositions. When needed, the two components can be mixed prior to application. If the partition 3 is fabricated from a material which ruptures or tears as a result of application of pressure, the mixing can be accomplished by applying a pressure to the outer walls 4, 4', whereby the partition 3 can be made to rupture or burst. Application of the pressure is typically done by the action of force. This action of force is preferably a striking action or bending of the pack. The material of the partition 3 is typically fabricated from glass, from aluminum, from aluminum alloy, from a thin plastic or from a composite material. The partition 3 must be fabricated in a thickness such that it does not rupture as a result of an unintended exposure to force, of the kind occurring typically, for example, in the course of transportation. The outer wall 4, 4' must be such that it does not rupture or tear when the pressure that leads to the rupture of the partition 3 is applied. The outer wall 4, 4' is fabricated either from a metal or from a flexible plastic. The mixing of the two components may be assisted by shaking. The mixed components can be applied and/or withdrawn through an outlet opening in the outer wall of the pack (not shown in FIGS. 1a, 1b).

Further suitable embodiments are those as described in WO 2005/093002 A1, more particularly by FIGS. 1 to 11. The packs of WO 2005/093002 are, through incorporation by reference, an integrated part of the present document and may be filled with the aqueous adhesion promoter composition described in detail above, to form packaging forms of the invention.

The aqueous adhesion promoter composition described is especially suitable as a primer, preferably as a primer for adhesives and sealants. Use of such a primer enhances the adhesion.

Accordingly the invention also encompasses a method of adhesive bonding or of sealing. Of this method the following three versions are preferred in particular.

In the first version the method comprises the steps of
i) applying an aqueous adhesion promoter composition as described to a substrate S1 to be bonded or sealed
ii) applying an adhesive or sealant to the flashed-off composition located on the substrate S1
iii) contacting the adhesive or sealant with a second substrate S2.

In the second version the method comprises the steps of
i') applying an aqueous adhesion promoter composition as described to a substrate S1 to be bonded or sealed
ii') applying an adhesive or sealant to the surface of a second substrate S2
iii') contacting the adhesive or sealant with the flashed-off composition which is located on the substrate S1.

In the third version the method comprises the steps of
i") applying an aqueous adhesion promoter composition as described to a substrate S1 to be bonded or sealed
ii") flashing off the composition
iii") applying an adhesive or sealant between the substrate surfaces S1 and S2.

In all three versions the second substrate S2 is composed of the same material as or different material to the substrate S1.

Typically step iii), iii') or iii") is followed by a step iv) of curing the adhesive or sealant.

The adhesive used can in principle be any adhesive. The advantageous improvements to adhesion have, however, been found in particular in the case of adhesives or sealants in which it is a polyurethane adhesive which comprises polyurethane prepolymers containing isocyanate groups. Polyurethane adhesives of this kind are widely available commercially, especially under the name Sikaflex® from Sika Schweiz AG.

The substrate S1 and/or S2 may be diverse in nature. Preferably at least one of the substrates, S1 or S2, is glass or glass ceramic or aluminum or an aluminum alloy.

With further preference at least one of the substrates, S1 or S2, is silver, more particularly a silver imprint on glass or glass ceramic.

It has been found that glass and ceramic react less sensitively to the adhesion promoter compositions in comparison to imprinted silver. It is therefore advantageous to use lower silane concentrations on glass and ceramic in order to determine differences in the individual aqueous adhesion promoter compositions between one another.

As and when necessary, the substrates may be pretreated before the sealant or adhesive is applied. Such pretreatments include, in particular, physical and/or chemical cleaning techniques, examples being abrading, sandblasting, brushing or the like, or treatment with cleaners or solvents, or the application of an adhesion promoter, adhesion promoter solution or primer.

The method is especially suitable for the adhesive bonding of glazing sheets. In one preferred embodiment, therefore, the substrate S1 or S2, respectively, is glass or glass ceramic and the substrate S2 or S1, is a paint or a painted metal or a painted metal alloy.

It has emerged in particular that mercaptosilanes lead to a strong improvement in adhesion of one-component polyurethane adhesives to silver or to silver-based compositions or alloys. Particularly good enhancement of adhesion is found on silver.

On the basis of this method, adhesively bonded articles are produced. Such articles preferably represent a means of transport, more particularly an automobile, bus, truck, rail vehicle, a boat or an aircraft.

It has emerged that the method described is especially suited to the adhesive bonding of glazing sheets having an integrated aerial. Aerial connection contacts of this kind are typically present on the glazing sheet, in the form of silver or silver-based compositions or alloys, more particularly in the form of silver imprints. Typically, parts of the edge region of the glazing sheet—where the adhesive is applied—feature surfaces of this kind. It is therefore important that the adhesive adheres well not only to glass and glass ceramic but also to silver-based compositions and/or alloys. FIG. 2 shows, diagrammatically, the tail view of an automobile 20 with a new-generation glazing sheet 7 with integrated aerial 12.

FIG. 3 shows, diagrammatically, a glazing sheet 7 of this kind with integrated aerial 12. The silver imprint for the aerial, 11, is located at different places on the glass ceramic 10 in the edge region of the sheet 7. Following installation, the aerials 12 are connected via the silver imprints 11 for the aerial, with an aerial connection piece 15, to the send or receive apparatus (not shown) in the interior of the vehicle 20. Additionally on the glass ceramic 10 there are also metal imprints 14 for connection to the glazing sheet heating system 13.

FIG. 3a shows an enlargement of an edge region of the sheet 7 with a silver imprint 11 of this kind which is connected to the aerial 12, and which from the edge is sited into the interior of the sheet, in order to ensure good receiving and/or emitting. The sheet 7 has a glass ceramic imprint 10 in the edge region of the sheet. The polyurethane adhesive 17 is applied in the edge region along the bonding line 16.

FIGS. 3b and 3c show a cross section through an installed glazing sheet 7 along the cross section A-A, and along the cross section B-B, respectively, in FIG. 3a. On the glass 8 is the glass ceramic 10. In FIG. 3b the polyurethane adhesive 17 is direct with the glass ceramic 10. In FIG. 3c the polyurethane adhesive 17 adheres to the silver imprint 11 for the aerial. On the other side the adhesive 17 is connected to the flange 18 of the automobile 20. The flange 18 is painted with an automobile paint. To ensure the adhesion, in the embodiment shown, a primer 19 is applied to the paint, and so there is a primer layer 19 present between painted flange 18 and adhesive 17.

The invention is of course not confined to the exemplary embodiments described and shown. It is understood that the features of the invention identified above can be used not only in the specific combination indicated but also in other modifications, combinations, and versions, or on their own, without departing the scope of the invention.

LIST OF REFERENCE SYMBOLS

| | |
|---|---|
| 1 | first chamber |
| 2 | second chamber |
| 3 | partition |
| 4, 4' | outer walls |
| 5 | pack |
| 6 | packaging form |
| K1 | first component |
| K2 | second component |
| 7 | glazing sheet |
| 8 | glass |
| 9 | primer |
| 10 | glass ceramic |
| 11 | silver imprint for aerial |
| 12 | Aerial |
| 13 | glazing sheet heating system |
| 14 | metal imprint for heating connection |
| 15 | aerial connection piece |
| 16 | adhesive application line |
| 17 | polyurethane adhesive |

-continued

| | |
|---|---|
| 18 | Flange |
| 19 | Primer |
| 20 | Automobile |

EXAMPLES

Different components K1 were produced, consisting of the silanes as per the data (parts by weight) in table 1. Components 1 to 9 correspond here to inventive components K1, while the components R1 to R10 represent comparative components.

Raw Materials Used:

| | |
|---|---|
| "A1120" | N-(2-Aminoethyl)-3-aminopropyltrimethoxysilane<br>Silquest ® A1120, GE Silicones, Switzerland |
| "A1170" | Bis(trimethoxysilylpropyl)amine<br>Silquest ® A1170, GE Silicones, Switzerland |
| "A1110" | 3-Aminopropyltrimethoxysilane<br>Silquest ® A1110, GE Silicones, Switzerland |
| "A189" | 3-Mercaptopropyltrimethoxysilane<br>Silquest ® A189, GE Silicones, Switzerland |
| "TEOS" | Tetraethoxysilane<br>Fluka Chemie AG, Switzerland |
| "A171" | Vinyltrimethoxysilane<br>Silquest ® A171, GE Silicones, Switzerland |
| "MTMS" | Methyltrimethoxysilane<br>Fluka Chemie AG, Switzerland |
| | Hydropalat ® 120, Cognis, Germany |
| "HS 2627" | Dynasylan ® HYDROSIL 2627, Degussa Deutschland<br>Aminosiloxane, amino-modified alkylpolysiloxane |

From these different first components K1 there were then produced, by mixing a second component K2, aqueous adhesion promoter compositions.

The substrates used were as follows floatglass (tin side used for adhesion test), Rocholl, Germany ESG ceramic, Ferro 14251, Rocholl, Germany silver imprint: silver imprint regions on original BMW rear screen, 3 Series (series status July 2006)

For this purpose, for glass and ceramic as substrates, 0.5% by weight of the respective component K1 was mixed with 99.5% of a component K2-1 consisting of 0.5 part by weight of Hydropalat® 120, 1 part by weight of acetic acid (100%), and 98 parts by weight of water.

For silver imprint as the substrate, 1.5% by weight of the respective component K1 were mixed with 98.5% of a component K2-2 consisting of 0.5 part by weight of Hydropalat® 120, 1 part by weight of acetic acid (100%), and 97 parts by weight of water.

The aqueous adhesion promoter compositions produced in this way were applied to the respective substrate by means of a cellulose cloth soaked with them (Tela®, Tela-Kimberly Switzerland GmbH) and left to air for 10 minutes, and a triangular bead of Sikaflex®-250 DM-2 ("DM-2"), or Sikaflex®-250 PC-T ("PC-T"), at 23° C. and 50% relative humidity, was applied by means of an extrusion cartridge and nozzle. Both adhesives are one-component, moisture-curing polyurethane adhesives which comprise polyurethane prepolymers containing isocyanate groups, and are available commercially from Sika Schweiz AG.

The adhesive was tested after a cure time of 6 days of climate chamber storage ('CS') (23° C., 50% relative humidity), and also after subsequent water storage ('WS') in water at 23° C. for 6 days, and also after subsequent heat/humidity storage ('HS') of 6 days at 70° C., 100% relative humidity.

The adhesion of the adhesive was tested by means of the bead test. For this purpose, the bead is incised at the end just above the adhesion face. The incised end of the bead is held with round-end tweezers and pulled from the substrate. This is done by carefully rolling up the bead on the tip of the tweezers, and placing a cut vertical to the bead pulling direction down to the bare substrate. The rate of bead removal is selected so that a cut has to be made around every 3 seconds. The test length must amount to at least 8 cm. An assessment is made of the adhesive which remains on the substrate after the bead has been pulled off (cohesive fracture). The adhesive properties are evaluated by visual estimation of the cohesive fraction of the adhesion face:

The higher the fraction of cohesive fracture, the better the estimate of the adhesive bond. Test results with cohesive fractures of less than 50%, and especially less than 40%, are typically considered to be inadequate.

TABLE 1

Compositions of different components K1.

| K1: | R1 | R2 | R3 | R4 | R5 | 1 | 2 | 3 | 4 | 5 | 6 | 7 | 8 | 9 | R6 | R7 | R8 | R9 | R10 |
|---|---|---|---|---|---|---|---|---|---|---|---|---|---|---|---|---|---|---|---|
| A1120 | 1 | 1 | | 1 | 1 | | 1 | | | | 1 | 1 | 1 | | 1 | 1 | | 1 | |
| A1170 | | | 1 | | | | 1 | | 1 | | | | | | | | | | |
| A1110 | | | | | | | | 1 | | | | | | | | | 1 | | |
| HS2627 | | | | | | | | | | | | | | 1 | | | | | 1 |
| A189 | | | 1 | | 1 | 1 | 1 | 1 | 1 | 1 | 1 | 1 | 1 | 1 | 1 | 1 | | 1 | 1 |
| TEOS | | 1 | | | | | | | 1 | 1 | | | | | | | | | |
| A171 | | | | | | | | | | | | | | | | | 1 | | |
| MTMS | | | | | 1 | | | | | | 0.1 | 0.2 | 0.4 | | 0.5 | 1 | 0.5 | | |

TABLE 2

Adhesion results of DM-2 on floatglass for different aqueous compositions consisting of component K2-1 and different components K1.

| K1: | R1 | R2 | R3 | R4 | R5 | R6 | R7 | R8 | R9 | R10 |
|---|---|---|---|---|---|---|---|---|---|---|
| CS | 100 | 90 | 100 | 70 | 50 | 80 | 100 | 80 | 100 | 100 |
| WS | 5 | 50 | 75 | 20 | 20 | 30 | 30 | 50 | 70 | 20 |
| HS | 100 | 70 | 75 | 5 | 30 | 100 | 100 | 70 | 100 | 20 |

| K1: | 1 | 2 | 3 | 4 | 5 | 6 | 7 | 8 | 9 |
|---|---|---|---|---|---|---|---|---|---|
| CS | 100 | 100 | 100 | 100 | 100 | 100 | 100 | 95 | 100 |
| WS | 100 | 100 | 100 | 100 | 100 | 100 | 95 | 40 | 100 |
| HS | 100 | 100 | 100 | 100 | 100 | 100 | 100 | 100 | 90 |

TABLE 3

Adhesion results of DM-2 on ESG ceramic for different aqueous compositions consisting of component K2-1 and different components K1.

| K1: | R1 | R2 | R3 | R4 | R5 | R10 | 1 | 2 | 3 | 4 | 5 | 6 | 9 |
|---|---|---|---|---|---|---|---|---|---|---|---|---|---|
| CS | 100 | 100 | 10 | 0 | 5 | 100 | 100 | 100 | 100 | 100 | 100 | 100 | 100 |
| WS | 100 | 100 | 0 | 0 | 0 | 30 | 100 | 100 | 100 | 100 | 100 | 100 | 100 |
| HS | 100 | 100 | 10 | 0 | 0 | 10 | 100 | 100 | 100 | 100 | 100 | 100 | 60 |

TABLE 4

Adhesion results of PC-T on silver coating for different aqueous compositions consisting of component K2-2 and different components K1.

| K1: | R1 | R2 | R3 | R10 | 1 | 2 | 4 | 5 | 9 |
|---|---|---|---|---|---|---|---|---|---|
| CS | 0 | 5 | 0 | 100 | 100 | 100 | 100 | 50 | 100 |
| WS | 0 | 0 | 0 | 0 | 80 | 90 | 80 | 50 | 100 |
| HS | 0 | 0 | 0 | 0 | 60 | 50 | 70 | 60 | 20 |

TABLE 5

Adhesion results of DM-2 on silver coating for different aqueous compositions consisting of component K2-2 and different components K1.

| K1: | R1 | R2 | R3 | R4 | R10 | 1 | 2 | 3 | 4 | 9 |
|---|---|---|---|---|---|---|---|---|---|---|
| CS | 0 | 5 | 0 | 0 | 0 | 100 | 80 | 50 | 100 | 100 |
| WS | 0 | 0 | 0 | 0 | 0 | 100 | 50 | 30 | 100 | 30 |
| HS | 0 | 0 | 0 | 0 | 0 | 0 | 0 | 0 | 0 | 30 |

The adhesion results of tables 2 to 5 show that good adhesion can be achieved simultaneously on glass, silver imprint, and ceramic with the composition of the invention, whereas in the case of the comparative examples there are weaknesses in respect of at least one of these substrates.

For table 6, aqueous compositions were produced which consist of 2% by weight of silane, or 2% by weight of silane mixture, mixed from the respective silanes in the parts by weight indicated, 0.5% by weight of Hydropalat® 120, 1% by weight of acetic acid (100%), and 96.5% by weight of water.

The storage stability of these aqueous adhesion promoter compositions was investigated by subjecting the aqueous composition to inspection after different numbers of days of storage at room temperature.

If the composition was clear, it was rated "OK" and evaluated as good. Where there was a slight turbidity, it was rated with a "st". Where there was severe turbidity, i.e., a milky appearance, it was rated with a "T". When there were instances of precipitation, an "A" was recorded. Evaluations with "T" and especially "A" are inadequate. Such compositions can in practice no longer be used as adhesion promoter compositions.

TABLE 6

Stability of aqueous adhesion promoter compositions.

| | | | | Storage time [d] | | | |
|---|---|---|---|---|---|---|---|
| | A1120 | A189 | 0 | 1 | 7 | 14 | 21 | 28 |
| R11 | 1 | 0 | OK | OK | OK | OK | OK | OK |
| R12 | 0 | 1 | OK | OK | A | A | A | A |
| 10 | 1 | 10 | OK | OK | St | A | A | A |
| 11 | 1 | 5 | OK | OK | OK | T | T | A |

TABLE 6-continued

Stability of aqueous adhesion promoter compositions.

| | | | | Storage time [d] | | | |
|---|---|---|---|---|---|---|---|
| | A1120 | A189 | 0 | 1 | 7 | 14 | 21 | 28 |
| 12 | 1 | 2 | OK | OK | OK | st | T | A |
| 13 | 1 | 1 | OK | OK | OK | st | T | A |
| 14 | 2 | 1 | OK | OK | OK | OK | OK | OK |

The results from table 6 show that aqueous compositions of mercaptosilanes of the formula (II) exhibit problems with storage stability. The results also show well, however, that by the addition of aminosilanes of the formula (I) it is possible greatly to reduce, or to eliminate, these storage problems. Inventive compositions can be produced which possess excellent storage stability.

The invention claimed is:

1. An aqueous adhesion promoter composition which comprises
   at least one aminosilane of the formula (I) or at least one aminosiloxane AS obtained from a condensation reaction of an aminosilane of the formula (I) with at least one further silane

at least one mercaptosilane of the formula (II);

and either which has an alkylsilanes content of 0% to 45% by weight based on the weight of the aminosilane or aminosiloxane AS, or in which the ratio of the number of moles of alkylsilanes to the number of moles of aminosilane or aminosiloxane AS amounts to a value of 0-0.60 where $R^1$ is an n-valent organic radical having at least one primary and/or secondary amino group,
   $R^{1'}$ is an m-valent organic radical having at least one mercapto group,
   $R^2$ and $R^{2'}$ each independently are H or an alkyl group having 1 to 4 C atoms or are an acyl group;
   $R^3$ and $R^{3'}$ each independently are H or are an alkyl group having 1 to 10 C atoms;
   a and b each independently stand for a value of 0, 1 or 2;
   and n and m each independently stand for the values 1, 2, 3, and 4.

2. The aqueous adhesion promoter composition of claim 1, wherein the composition additionally contains at least one tetraalkoxysilane of the formula (IV)

where $R^4$ each independently is H or an alkyl group having 1 to 4 C atoms or is an acyl group.

3. The aqueous adhesion promoter composition of claim 1, wherein the composition is free of alkylsilanes.

4. The aqueous adhesion promoter composition of claim 1, wherein the composition is free of organosilanes OS whose organic radical which is attached via an Si—C bond to the silicon atom contains at least one functional group which is able to react with the amino group of the aminosilane of the formula (I) or with the mercapto group of the mercaptosilane of the formula (II).

5. The aqueous adhesion promoter composition of claim 1, wherein the composition is free of organosilanes whose organic radical which is attached via an Si—C bond to the silicon atom contains hydroxyl groups.

6. The aqueous adhesion promoter composition of claim 1, wherein the aminosilane of the formula (I) has the formula (V)

$$H_2N—R^5—Si(OR^2)_{(3-a)}(R^3)_a \qquad (V)$$

where $R^5$ is a linear or branched alkylene group having 1 to 6 C atoms.

7. The aqueous adhesion promoter composition of claim 1, wherein the aminosilane of the formula (I) contains secondary amino groups.

8. The aqueous adhesion promoter composition of claim 7, wherein the aminosilane of the formula (I) has the formula (VI) or (VII) or (VIII)

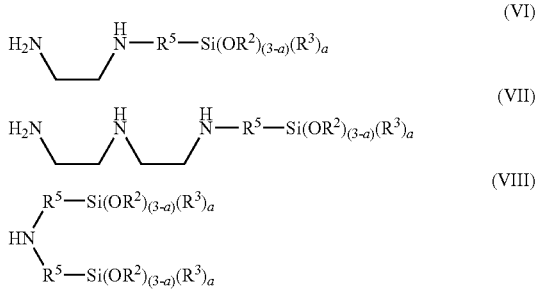

where $R^5$ is a linear or branched alkylene group having 1 to 6 C atoms.

9. The aqueous adhesion promoter composition of claim 1, wherein the mercaptosilane of the formula (II) has the formula (IX)

$$HS—R^{5'}—Si(OR^2)_{(3-b)}(R^{3'})_b \qquad (IX)$$

where $R^{5'}$ is a linear or branched alkylene group having 1 to 6 C atoms.

10. The aqueous adhesion promoter composition of claim 1, wherein an alkylsilane is used for preparing the aminosiloxane AS.

11. The aqueous adhesion promoter composition of claim 1, wherein the aqueous adhesion promoter composition further comprises at least one surfactant.

12. The aqueous adhesion promoter composition of claim 1, wherein the aqueous adhesion promoter composition further comprises at least one acid.

13. The aqueous adhesion promoter composition of claim 1, wherein the weight fraction of the total of aminosilane of the formula (I), aminosiloxane AS, mercaptosilane of the formula (II), and water and also, if present, tetraalkoxysilane of the formula (IV):

$$Si(OR^4)_4 \qquad (IV)$$

where $R^4$ each independently is H or an alkyl group having 1 to 4 C atoms or is an acyl group, is more than 80% by weight based on the weight of the aqueous adhesion promoter composition.

14. The aqueous adhesion promoter composition of claim 1, wherein the weight fraction of the total of aminosilane of the formula (I), aminosiloxane AS, mercaptosilane of the formula (II) and, if present, tetraalkoxysilane of the formula (IV):

$$Si(OR^4)_4 \qquad (IV)$$

where $R^4$ each independently is H or an alkyl group having 1 to 4 C atoms or is an acyl group, is more than 0.1% by weight based on the weight of the aqueous adhesion promoter composition.

15. The aqueous adhesion promoter composition of claim 1, wherein the aqueous adhesion promoter composition is composed of water, at least one aminosilane of the formula (I) or at least one aminosiloxane AS, at least one mercaptosilane of the formula (II), and, optionally, a surfactant and an acid, and also of the possible hydrolysis and/or condensation products thereof.

16. The aqueous adhesion promoter composition of claim 1, wherein the aqueous adhesion promoter composition is two-component and is composed of a first component K1 and a second component K2,
the first component K1 comprising at least the aminosilane of the formula (I) or the aminosiloxane AS and the mercaptosilane of the formula (II) and, if present, the tetraalkoxysilane of the formula (IV):

$$Si(OR^4)_4 \qquad (IV)$$

where $R^4$ each independently is H or an alkyl group having 1 to 4 C atoms or is an acyl group,
and the second component K2 comprising at least water.

17. The aqueous adhesion promoter composition of claim 16, wherein the second component K2 comprises at least one surfactant.

18. The aqueous adhesion promoter composition of claim 16, wherein the second component K2 comprises at least one acid.

19. A packaging form composed of a pack which has two chambers separated from one another by at least one partition; and
an aqueous two-component adhesion promoter composition of claim 16, the first component K1 being present in a first chamber and the second component K2 in a second chamber.

20. The packaging form of claim 19, wherein the partition is fabricated from a material which ruptures or tears as a result of application of pressure.

21. A primer comprising the aqueous adhesion promoter composition of claim 1.

22. A method of adhesive bonding or sealing using the aqueous adhesion promoter composition of claim 1, comprising the steps of
i) applying the aqueous adhesion promoter composition to a substrate S1 to be bonded or sealed
ii) applying an adhesive or sealant to the flashed-off composition located on the substrate S1
iii) contacting the adhesive or sealant with a second substrate S2;
or
i') applying the aqueous adhesion promoter composition to a substrate S1 to be bonded or sealed ii') applying an adhesive or sealant to the surface of a second substrate S2
iii') contacting the adhesive or sealant with the flashed-off composition which is located on the substrate S1;
or
applying the aqueous adhesion promoter composition to a substrate S1 to be bonded or sealed
ii") flashing off the composition
iii") applying an adhesive or sealant between the substrate surfaces S1 and S2,
where the second substrate S2 is composed of the same material as or different material to the substrate S1.

23. The method of claim 22, wherein step iii), iii') or iii") is followed by a step iv) of curing the adhesive or sealant.

24. The method of claim 22, wherein the adhesive or sealant is a polyurethane adhesive which comprises polyurethane prepolymers containing isocyanate groups.

25. The method of claim 22, wherein at least one of the substrates, S1 or S2, is glass or glass ceramic or aluminum or an aluminum alloy.

26. The method of claim 22, wherein at least one of the substrates, S1 or S2, is silver.

27. The method of claim 22, wherein the substrate S1 or S2, respectively, is glass or glass ceramic and the substrate S2 or S1, respectively, is a paint or a painted metal or a painted metal alloy.

28. A method of claim 22 for promoting the adhesion of moisture-curing one-component polyurethane adhesives to silver or to silver-based compositions or alloys, comprising contacting a mercaptosilanes with the adhesive.

29. An article produced by a method of claim 22.

30. The article of claim 29, wherein the article is a means of transport.

* * * * *